United States Patent [19]

Lee

[11] 4,343,914
[45] Aug. 10, 1982

[54] FLAME RETARDANT POLYURETHANE CONTAINING ALKYL BIS(3-HYDROXYPROPYL) PHOSPHINE OXIDE

[75] Inventor: Fui-Tseng H. Lee, Princeton, N.J.

[73] Assignee: FMC Corporation, Philadelphia, Pa.

[21] Appl. No.: 285,888

[22] Filed: Jul. 22, 1981

[51] Int. Cl.$^3$ ............................................. C08G 18/14
[52] U.S. Cl. ..................................... 521/168; 528/72
[58] Field of Search ........................... 521/168; 528/72

[56] References Cited

U.S. PATENT DOCUMENTS

| | | | |
|---|---|---|---|
| 3,076,034 | 1/1963 | Gordon | 260/606.5 |
| 3,099,684 | 7/1963 | Rauhut et al. | 260/185 |
| 3,100,799 | 8/1963 | Rauhut et al. | 260/606.5 |
| 3,267,149 | 8/1966 | Garner | 260/606.5 |
| 3,269,963 | 8/1966 | Ilgemann et al. | 260/2.5 |
| 3,304,263 | 2/1967 | York et al. | 252/132 |
| 3,306,937 | 2/1967 | Clampitt et al. | 260/606.5 |
| 3,341,625 | 9/1967 | Gillham et al. | 260/887 |
| 3,346,647 | 10/1967 | Garner | 260/606.5 |
| 3,434,981 | 3/1969 | Baranauckas et al. | 260/2.5 |
| 3,445,405 | 5/1969 | Vogt | 260/2.5 |
| 3,489,811 | 1/1970 | Drucker et al. | 260/606.5 |
| 3,629,365 | 12/1971 | Gardner | 260/857 PE |
| 3,654,342 | 4/1972 | Gillham et al. | 260/468.8 |
| 3,666,543 | 5/1972 | Maier | 117/136 |
| 3,683,028 | 8/1972 | Haas | 260/606.5 P |
| 3,716,580 | 2/1973 | Maier | 260/488 J |
| 3,736,349 | 5/1973 | Gillham et al. | 260/486 R |
| 3,931,104 | 1/1976 | Luders | 260/45.85 R |
| 3,948,980 | 4/1976 | Dettmeier et al. | 260/488 J |
| 3,970,636 | 7/1976 | Hardy et al. | 260/45.8 NE |
| 4,007,229 | 2/1977 | Hechenbleikner | 260/606.5 P |
| 4,056,571 | 11/1977 | Kleiner | 260/583 E |
| 4,087,408 | 5/1978 | Moedritzer | 260/47 P |
| 4,127,566 | 11/1978 | King et al. | 528/283 |

FOREIGN PATENT DOCUMENTS 2605307 8/1976 Fed. Rep. of Germany .
1028158 6/1966 United Kingdom .

OTHER PUBLICATIONS

Anthony J. Papa—*Flame Retardation of Polyurethane Foams in Practice; Ind. Eng. Chem. Prod. Res. Develop.,* pp. 379–389, vol. 11, No. 4 (1972).

*Primary Examiner*—Maurice J. Welsh
*Attorney, Agent, or Firm*—Robert W. Kell; Eugene G. Horsky

[57] ABSTRACT

Polyurethane compositions are rendered fire retardant by substitution for some of the polyol normally present in the reaction mixture, an effective amount of a 3-hydroxypropyl phosphine oxide such as sec-butyl bis(3-hydroxypropyl) phosphine oxide.

14 Claims, No Drawings

FLAME RETARDANT POLYURETHANE CONTAINING ALKYL BIS(3-HYDROXYPROPYL) PHOSPHINE OXIDE

The present invention relates to polyurethane compositions which are rendered flame retardant by adding to the reaction mixture at the time that the polyurethane is prepared an effective amount of an alkyl bis(3-hydroxypropyl) phosphine oxide.

The consumption of flame retardant polyurethane foams has become of increasing importance within the last ten years. The industrial use of such products, various approaches to obtaining flame retardant polyurethane foams, and flammability test methods are discussed by Anthony J. Papa in Ind. Eng. Chem. Prod. Res. Develop., Volume 11, No. 4, 1972. The problem of flame retarding polyurethane foams has attracted the attention of many investigators. The production of fire retardant polyurethane foams from a new class of polyols is described in U.S. Pat. No. 3,297,597. The production of hardened polyurethane foams that are rendered flame retardant by the addition of a halogenated diphosphonate in quantities of from about 2% to 25% is referred to in U.S. Pat. No. 2,192,242 and U.S. Pat. No. 3,042,701 discloses phosphorus polyesters that are said to be useful fire retardant additives for polyurethane resins.

With the current and future requirements for flame resistant polyurethane foams as an insulating material in new and old construction, a substantial growth in the use of such products has occurred. There is a substantial and increasing demand for flame retardant rigid polyurethane foam compositions.

The known flame retardants for polyurethane compositions suffer generally from one or more deficiencies including low compatibility, low thermal stability or poor fire retardant behavior.

The present invention is predicated upon the discovery that the addition of a small but effective amount of an alkyl bis(3-hydroxypropyl) phosphine oxide having the formula:

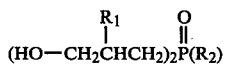

wherein $R_1$ may be the same or different radicals selected from the group consisting of hydrogen and the methyl radicals and $R_2$ is an alkyl radical of 2 to 8 carbon atoms; a reaction mixture containing other polyols and a diisocyanate will substantially improve the flame retardant properties of the polyurethane that is obtained. The addition of the alkyl bis(3-hydroxypropyl) phosphine oxide to the polyurethane resin composition in the amount required to improve flame retardant properties is made prior to reaction of the polyol with the diisocyanate. Under these conditions, the phosphine oxide reacts with the diisocyanate and becomes a part of the polyurethane chain.

The alkyl bis(3-hydroxypropyl) phosphine oxides described herein are effective when added in small quantities, i.e., 10-30 parts per hundred based on the weight of the other polyols present in the polyurethane reaction mixture. Particularly preferred compositions are flame retardant rigid polyurethane foam compositions to which have been added from about 15 to about 20 parts of an alkyl bis(3-hydroxypropyl) phosphine oxide based on 100 parts of other polyols present in the polyurethane reaction mixture.

The flame resistant rigid polyurethane foam compositions of the present invention are particularly advantageous for use in slab (board) stock.

The alkyl bis(3-hydroxypropyl) phosphine oxide that is reacted with polyurethane in accordance with the present invention is more soluble in water than in polar organic solvents such as chloroform. Such phosphine oxides, because they react with and become a part of the polymer, combine high compatibility with high thermal stability and excellent fire retardant efficiency either alone or in combination with organohalogen products. A preferred organohalogenated product is a chlorinated polyol derived from trichlorobutylene oxide and a polyhydroxy compound sold by the Olin Corporation, 120 Long Ridge Road, Stamford, Conn. 06904 under the trade name THERMOLIN® RF-230. Other organohalogen compounds that will react with the polyurethanes are those that contain one or more halogen atoms and one or more active hydrogen atoms in their molecular structure such as brominated mono- and bifunctional alkyl alcohols.

The merits that may be attributed to the alkyl bis(3-hydroxypropyl) phosphine oxide flame retardant (relative to conventional flame retardant agents in present use) include no corrosion, high ultraviolet stability, non-toxicity and minimal adverse change in the physical properties of the polyurethane. The thermal stability of the polyurethane composition is not appreciably effected by the addition thereto of 5-7 parts per hundred of the phosphine oxide flame retardant as indicated by thermal gravametric analysis. Particularly advantageous are the sec-butyl bis(3-hydroxypropyl) phosphine oxide and n-butyl bis(3-hydroxypropyl) phosphine oxide which are compatible and react with the polyurethane.

The alkyl bis(3-hydroxypropyl) phosphine oxides may be prepared by first reacting an excess of an unsaturated olefin having 2-8 carbon atoms such as butene with phosphine in the presence of a free radical catalyst as described below in Example I. We have discovered that the use of 50% excess of the olefin will react with phosphine to give almost a quantative yield of alkyl phosphine. The alkyl phosphine may then be reacted with allyl alcohol or methallyl alcohol and oxidized with hydrogen peroxide to obtain the desired alkyl bis(3-hydroxypropyl) phosphine oxide.

The polyurethane precursor compositions that react with the phosphine oxide to produce the flame retardant polyurethane of the present invention may be prepared by the "one shot" method wherein one or more polyols are reacted with a polyisocyanate and the alkyl bis(3-hydroxypropyl) phosphine oxide.

The polyols may be one or more of many known polyfunctional hydroxy-containing polyethers. Polyethers used in rigid foams are generally based on propylene oxide adducts of various polyfunctional alcohols or amines such as glycerine, pentaerythritol, trimethylolpropane, sorbitol, α-methyl glucoside, sucrose and ethylenediamine.

The polyisocyanates that are employed in preparing the polyurethane foams of the present invention are not critical. Suitable polyisocyanates are any one or mixture of the well known commercial products containing two or more isocyanate groups such as a mixture of polyphenylene polymethyl isocyanates analyzing 31.5%, NCO manufacture by Mobay Chemical Corporation, Pittsburgh, Pa. 15205 under the trade name MONDUR MR ®.

If a flame resistant foamed polyurethane resin is desired, any of the well known volatile additives such as trichlorofluoromethane (FREON 11) or gasing agents that become volatile at the reaction temperature of the polyurethane reaction mixture may be used.

The following Examples will more fully illustrate the invention.

EXAMPLE I

This Example illustrates the preparation of sec-butyl bis(3-hydroxypropyl) phosphine oxide.

Into a four liter stainless steel pressure reactor was placed 224 g (4 moles) of mixed 2-butene, 600 ml of toluene, 204 g (6.0 moles, 50% excess) of phosphine and 25 ml of a solution of 4 g azobisisobutyronitrile in 100 ml of toluene. The reaction vessel was heated and stirred at 85° C. to 90° C. for one hour and the remaining azobisisobutyronitrile solution is added in 25 ml portions every 30 minutes until the 100 ml of catalyst solution is used up. The reaction mixture was heated and stirred at 90° C. for 4 hours after the last addition of catalyst solution and then allowed to cool overnight.

The phosphine was vented from the reaction vessel and 487 g (8.4 moles, 5% excess) allyl alcohol was added together with 50 ml of a solution of 8 g azobisisobutyronitrile in 200 ml of toluene. The reaction mixture was heated with stirring at 90° C. with the addition of 50 ml azobisisobutyronitrile catalyst solution every 30 minutes until all 200 ml of solution had been added. Heating and stirring were continued at 90° C. for 4 hours and the reaction vessel was then allowed to cool to room temperature. The liquid from the reaction vessel was heated to 130° C./200 Pa (130° C./1.5 mm) to remove volatile components. The residual was a greenish liquid sec-butyl bis(3-hydroxypropyl) phosphine weighing 519.3 g.

The non-volatile greenish liquid is dissolved in an equal volume of isopropanol and oxidized by stirring with the dropwise addition of a 30% aqueous hydrogen peroxide solution diluted with an equal volume of isopropanol.

When the exothermic reaction subsides, the solution of phosphine oxide is tested by adding one drop of the solution to 1 ml of carbon disulfide until no red coloration can be detected visually in the carbon disulfide layer. This indicates complete oxidation of the phosphine to sec-butyl bis(3-hydroxypropyl) phosphine oxide. The solution of oxidized phosphine is concentrated under reduced pressure to yield a syrupy yellow liquid weighing 555.6 g (99.2% yield on oxidation or a yield of 62.5% based on the starting butene).

This product has the following analyses:

| Found (%) | Calculated for s-butyl bis(3-hydroxypropyl) phosphine oxide (%) |
|---|---|
| C = 51.80, 52.06 | 54.05 |
| H = 8.72, 8.94 | 10.36 |
| P = 13.79 | 13.96 |

EXAMPLE II

This Example illustrates the preparation of a rigid polyurethane foam.

Eighty grams of a sucrose-based polyether polyol having a hydroxy number of 470, sold under the trademark MULTRANOL ® 4034 by Mobay Chemical Corporation, Pittsburgh, Pa. was mixed with 20 g of an amine-based polyether polyol having a hydroxy number of 470, sold under the trademark MULTRANOL ® 4051 by Mobay Chemical Corporation and 1.5 g of a silicon surfactant, UNION CARBIDE ® L-5340 sold by Union Carbide Corporation, 270 Park Avenue, New York, N.Y. 10017. This mixture was agitated at about 2,000 rpm for 40 seconds in a paper cup and 33 g of trichlorofluoromethane (FREON 11), was added with continued stirring for another 20 seconds. The mixture was allowed to degas for 30 seconds and then 1.5 g of an amine catalyst (tetramethylbutanediamine) was added and mixed for 5 seconds. One hundred and twenty grams of a polyisocyanate containing 31.5 weight percent NCO, sold by the Mobay Chemical Corporation under the trademark MONDUR MR ® was then added all at once and mixed until the mixture began to cream. The creamy mixture was poured into a paper box measuring 98×98×367 mm and allowed to foam. The foamed product was cured in an oven at 130° C. for 1 hour. The cured foam was cut into strips measuring 150 mm×50 mm×12.7 mm for flammability tests. The burn time of this product is reported in Table I and the oxygen index is reported in Table II.

This Example may be repeated without the addition of a foaming agent to produce a dense (non-foamed) polyurethane.

EXAMPLE III

This Example describes the preparation of a flame retardant rigid polyurethane foam.

A rigid polyurethane foam containing sec-butyl bis(3-hydroxypropyl) phosphine oxide was prepared as described above in Example II using the formulation given below:

| | Grams |
|---|---|
| Sucrose-based polyether polyol (MULTRANOL ® 4034) | 80 |
| Amine-based polyether polyol (MULTRANOL ® 4051) | 20 |
| Silicon Surfactant (UNION CARBIDE ® L-5340) | 1.5 |
| Sec-butyl bis(3-hydroxy) phosphine oxide (Example I) | 10 |
| FREON 11 | 33 |
| Tetramethylbutanediamine | 1.5 |
| Polyisocyanate (MONDUR MR ®) | 130 |
| NCO Index | 105 |

This product had a foam density of 3.21. The foam density may be varied between 1.7 and 4.0 by varying the amounts of FREON 11 in the formulation. The heat cured foamed product was cut into strips measuring 150 mm×50 mm×12.7 mm for flammability tests. The burn time of this product (determined by ASTM Method 1692-74) is summarized in Table I. The oxygen index of this product (ASTM Method 2863-77) is reported in Table II.

This Example may be repeated without the addition of a foaming agent to produce a dense (non-foamed) polyurethane that has flame retardant characteristics.

EXAMPLE III(a)

Example III above was repeated substituting for the 10 g of sec-butyl bis(3-hydroxypropyl) phosphine oxide 15 g of sec-butyl bis(3-hydroxypropyl) phosphine oxide and increasing the amount of MONDUR MR ® from 130 g to 136 g. The burn time of this product (determined by ASTM Method 1692-74) is summarized in Table I.

EXAMPLE III(b)

Example III above was repeated substituting for the 10 g of sec-butyl bis(3-hydroxypropyl) phosphine oxide 20 g of sec-butyl bis(3-hydroxypropyl) phosphine oxide and increasing the amount of MONDUR MR ® from 130 g to 146.0 g. The burn time of this product (determined by ASTM Method 1692-74) is summarized in Table I.

EXAMPLE III(c)

Example III above was repeated substituting for the 10 g of sec-butyl bis(3-hydroxypropyl) phosphine oxide 30 g of sec-butyl bis(3-hydroxypropyl) phosphine oxide and increasing the amount of MONDUR MR ® from 130 g to 166.3 g. The burn time of this product (determined by ASTM Method 1692-74) is summarized in Table I. The oxygen index (ASTM Method 2863-77) is reported in Table II.

EXAMPLE IV

This Example demonstrates that sec-butyl bis(3-hydroxypropyl) phosphine oxide is a reactive type flame retardant agent in that it becomes an integral part of the polyurethane polymer chain.

One hundred and three grams of the rigid foam product prepared in Example III was grounded up to fine particles. These particles were then stirred for several hours in boiling water. The water was separated from the foam particles by filtration and evaporated to dryness. No water extractable material was recovered as a residue upon evaporation indicating that all of the sec-butyl bis(3-hydroxypropyl) phosphine oxide (which is water soluble) had reacted with the polyisocyanate.

EXAMPLE V

This Example describes the flammability test procedure used to compare the burning behavior of rigid polyurethane foam samples reported in Table I.

The burn tests were carried out according to ASTM Method 1692-74, using a specimen supported by a horizontal screen. The cured foam samples were cut into several specimens 50±0.25 mm wide by 150±1 mm long and 12.7±0.25 mm thick. Five of those specimens from each of Examples II, III, III(a) and III(b) were conditioned for 48 hours in an atmosphere having a temperature of 23°±2° C. and a relative humidity of 50±5%. Each conditioned specimen was placed on a wire cloth supported specimen 75 mm by 215 mm having associated therewith a linear gauge. The burn tests were conducted in a laboratory hood with the hood exhaust fan being off. The test specimen was ignited for 60 seconds with a bunson burner and the burner then removed from the test specimen. The time in seconds was recorded when the flame front reached the 125 mm gauge mark. If this did not occur, the time in seconds for the flame to go out was recorded. The extent of burning of any test specimen is equal to 125 mm minus the distance from the gauge marks to the nearest evidence of the flame front such as charring along the upper surface of the specimen, measured to the nearest 2 mm. All five specimens from Examples II, III, III(a) and III(b) were tested and their results averaged. The burn results are summarized in Table I.

EXAMPLE VI n-Butyl-bis(3-Hydroxypropyl) Phosphine Oxide

Into a four liter stainless steel pressure reactor is placed 0.5 g azobisisobutyronitrile dissolved in 600 ml of toluene. The reactor is purged with nitrogen and charged with 112 g (2.0 moles) of butene and 102 g (3.0 moles, 50% excess) phosphine. The reaction mixture is heated and stirred at 85° C.-90° C. for one hour and maintained at that temperature with stirring while five 20 ml portions of azobisisobutyronitrile solution (5.5 g in 350 ml of toluene) are added at 20 minute intervals over 1 hour 40 minutes. No exotherm is noted during the catalyst addition and the pressure reading dropped from 13 KPa (190 psig) at the time of the first 20 ml addition to 1.27 KPa (185 psig) 20 minutes after the last catalyst addition.

The excess phosphine is vented from the reaction vessel and 278 g (4.8 moles, 20% excess) of allyl alcohol and 40 ml of the azobisisobutyronitrile catalyst solution is added to the reaction vessel. No exotherm is observed and heating is continued at 85° C.-90° C. with stirring and addition of 20 ml of azobisisobutyronitrile every 20 minutes until all of the catalyst solution (350 ml) has been added. The temperature is maintained with stirring at 80° C.-90° C. for 11 hours. A clear yellow liquid is removed from the reactor and heated to 110° C./1.0 mm to distill off the volatile materials. The residue is a clear yellow liquid weighing 290.9 grams. The residue is dissolved in an equal volume of isopropanol and oxidized with 30% hydrogen peroxide dissolved in an equal volume of isopropanol as described above in Example I to give 308.2 g of a viscous yellow liquid (after removal of water and isopropanol) containing a small amount of a white suspended solid. The mixture is diluted with chloroform, filtered to remove the white solid, and the chloroform is evaporated to give a clear yellow liquid. The analysis of this liquid product is:

| Found (%) | Calculated for n-butyl bis(3-hydroxypropyl) phosphine oxide (%) |
|---|---|
| C = 54.50, 54.40 | 54.05 |
| H = 10.21, 10.21 | 10.36 |
| P = 13.28, 13.65 | 13.96 |

This product, which is believed to contain n-butyl bis(3-hydroxypropyl) phosphine oxide and minor amounts of 3-hydroxypropyl di-n-butyl phosphine oxide, is useful as a fire retardant in polyurethane foam compositions when present in amounts between about 4 and about 10 weight percent. The phosphine oxide is added to the reaction mixture at the time that the polyurethane is prepared and becomes a part of the polyurethane resin.

EXAMPLE VII

This Example describes the preparation of a flame retardant polyurethane foam which contains a chlorinated polyol.

A rigid polyurethane foam containing a chlorinated polyol was prepared as described above in Example II using the formulations given below:

| | Grams |
|---|---|
| THERMOLIN® RF-230[1] | 100 |
| (47% chlorine; Hydroxyl No. 340) | |
| NIAX® Polyether Polyol 1646[2] | 20 |
| (Hydroxyl No. 47) | |
| MULTRANOL® 4034 | 60 |
| UNION CARBIDE® L-5340 | 4 |
| FREON 11 | 60 |
| Tetramethylbutanediamine | 3 |
| MONDUR MR® | 164.3 |
| NCO Index | 110 |

[1]THERMOLIN® FR-230 is a chlorinated polyol manufactured by Olin Corporation, Stamford, Connecticut.
[2]NIAX® is a polyol manufactured by Union Carbide, 270 Park Avenue, New York, New York 10017.

The foamed product after curing had a density of 2 lbs./cu. ft. (32 Kg/m$^3$) and an oxygen index (determined by ASTM Method 2863-77) of 23.2.

EXAMPLE VIII

A rigid polyurethane foam containing both sec-butyl bis(3-hydroxypropyl) phosphine oxide and a chlorinated organic compound was prepared as described above in Example II using the formulation given below:

| | Grams |
|---|---|
| THERMOLIN® RF-230 | 100 |
| NIAX® Polyether Polyol 1646 | 20 |
| MULTRANOL® 4034 | 60 |
| UNION CARBIDE® L-5340 | 4 |
| FREON 11 | 80 |
| Tetramethylbutanediamine | 4 |
| MONDUR MR® | 192.1 |
| Sec-butyl bis(3-hydroxypropyl) phosphine oxide | 20 |
| NCO Index | 110 |

The cured product contains 11 pph of phosphine oxide based on the other polyols present in the polyurethane resin has a density of 2.04 lbs./cu. ft. (32.7 Kg/m$^3$) and the oxygen index (determined by ASTM Method 2863-77) was 25.5.

The oxygen index of some of the polyurethane compositions described in the above Examples contain no flame retardant is compared with other polyurethane foams prescribed above that contains phosphine oxide with or without organohalogen additives the preparation of which is described in the preceding Examples and is summarized in Table II.

The invention in its broader aspects is not limited to the specific details shown and described but departure may be made from such details within the scope of the accompanying claims without departing from the principles of the invention and without sacrificing its chief advantage.

TABLE I

| Example | Flame Retardant | Foam Density lb/ft$^3$ | Foam Density Kg/m$^3$ | Burn Extent mm | Burn Time Seconds |
|---|---|---|---|---|---|
| II | — | 3.00 | 48.1 | 125.0 | 91 |
| III | 10 pph | 3.28 | 52.5 | 27.5 | 78 |
| III(a) | 15 pph | 2.23 | 35.7 | 44.0 | 51 |
| III(b) | 20 pph | 2.25 | 36.0 | 26.0 | 45 |
| III(c) | 30 pph | 2.25 | 36.0 | 16.0 | 51 |

Foam densities were determined according to ASTM D1622-63.

TABLE II

| Example | Flame Retardant | Oxygen Index |
|---|---|---|
| II | — | 19.3 |
| III | 10 pph | 21.2 |
| III(c) | 30 pph | 23.2 |
| VII | — | 23.2 |
| VIII | 11 pph | 25.5 |

I claim:

1. A polyurethane composition rendered flame retardant by having combined therewith an effective amount of an alkyl bis(3-hydroxypropyl) phosphine oxide having the formula:

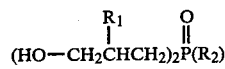

wherein R$_1$ may be the same or different radicals selected from the group consisting of hydrogen and the methyl radicals and R$_2$ is an alkyl radical of 2 to 8 carbon atoms.

2. The composition of claim 1 wherein said polyurethane composition is a rigid polyurethane foam.

3. The composition of claim 1 wherein the phosphine oxide is n-butyl bis(3-hydroxypropyl) phosphine oxide.

4. The composition of claim 2 wherein the phosphine oxide is s-butyl bis(3-hydroxypropyl) phosphine oxide.

5. The composition of claim 2 wherein said rigid polyurethane foam composition contains from about 10 parts to about 30 parts by weight of said phosphine oxide based on 100 parts by weight of other polyols present in said polyurethane resin.

6. The composition of claim 4 to which has been added about 6 parts per hundred of s-butyl bis(3-hydroxypropyl) phosphine oxide.

7. A method of manufacturing a flame retardant polyurethane composition which comprises adding to the polyurethane reaction mixture an effective amount of an alkyl bis(3-hydroxypropyl) phosphine oxide having the formula:

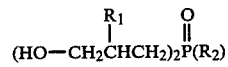

wherein R$_1$ may be the same or different radicals selected from the group consisting of hydrogen and the methyl radicals and R$_2$ is an alkyl radical of 2 to 8 carbon atoms.

8. The method of claim 7 wherein said polyurethane composition is a rigid polyurethane foam.

9. The method of claim 8 wherein the phosphine oxide is s-butyl bis(3-hydroxypropyl) phosphine oxide.

10. The method of claim 7 wherein from about 10 parts to about 30 parts of phosphine oxide is added to 100 parts by weight of other polyols present in said polyurethane reaction mixture.

11. A polyurethane composition rendered flame retardant by having combined therewith an effective amount of an alkyl bis(3-hydroxypropyl) phosphine oxide having the formula:

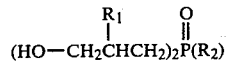

wherein $R_1$ may be the same or different radicals selected from the group consisting of hydrogen and the methyl radicals, $R_2$ is an alkyl radical of 2 to 8 carbon atoms and a halogenated organic compound.

12. The composition of claim 11 wherein said polyurethane composition is a rigid polyurethane foam.

13. The composition of claim 11 wherein the halogenated organic compound is a halogenated polyol.

14. The composition of claim 11 wherein halogenated organic compound is a chlorinated polyol.

* * * * *